May 28, 1963  S. D. SUMERFORD ET AL  3,091,628
TELOMERIZATION OF ALKOXY BORON COMPOUNDS
Filed Feb. 23, 1961
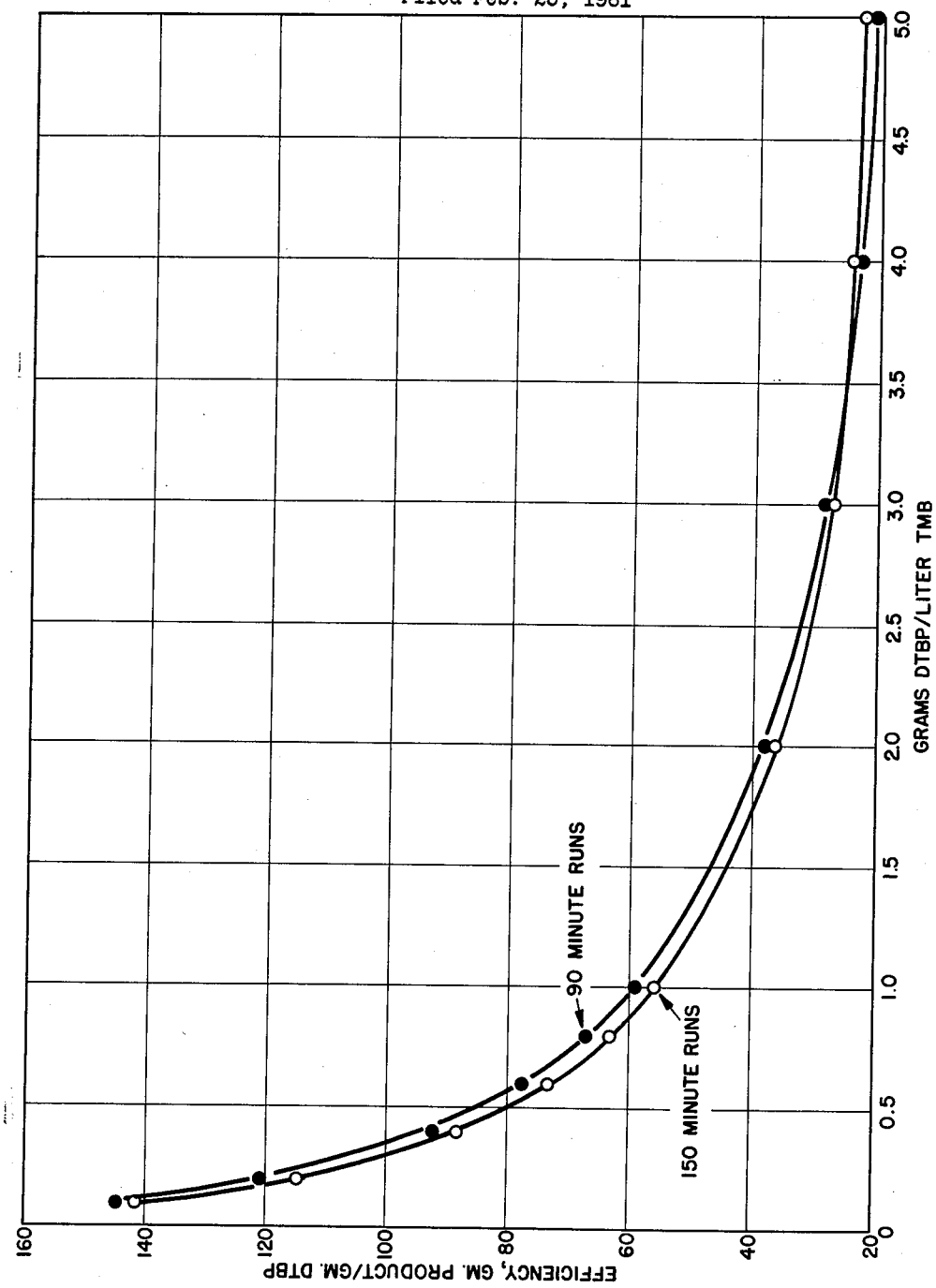
Simpson Douglas Sumerford
Walter James Porter, Jr.  INVENTORS
BY  Seymour Stahl
                    PATENT ATTORNEY

United States Patent Office 3,091,628
Patented May 28, 1963

3,091,628
TELOMERIZATION OF ALKOXY BORON COMPOUNDS
Simpson Douglas Sumerford and Walter James Porter, Jr., Baton Rouge, La., assignors to Esso Research and Engineering Company, a corporation of Delaware
Filed Feb. 23, 1961, Ser. No. 91,146
18 Claims. (Cl. 260—462)

This invention relates to a process for preparing oxygenated organic compounds by reaction of certain organic boron compounds with certain unsaturated low molecular weight hydrocarbons, in the presence of an initiator. More particularly, this invention relates to the preparation of alcohols by reaction of alkyl borates with a low molecular weight olefin in the presence of an initiator, followed by hydrolysis or alcoholysis or other molecule splitting means.

The novel portions of this invention reside in the so-called telomerization step wherein the organic boron compound is converted to high molecular weight organic boron compounds. The second step of converting the thus formed organic boron compound to alcohols and other by-products is not per se a novel element of the process but will be described in terms of its commercial application in the manufacture of alcohols.

In the preferred embodiment of this invention a methyl borate is reacted with ethylene in the presence of an initiator under certain conditions to produce a mixture of high molecular weight alkyl borate esters. The alkyl borate esters thus formed are known in the art and may be converted at least in part to the corresponding alcohol by conventional means.

The fast rate of growth in the petrochemical field, as well as the diversified nature of this growth, has created a need for many organic compounds to be used as end products or as intermediate building blocks for the production of end-use chemical products. Among the organic compounds finding extremely wide utility today are the alcohols and especially those having carbon chain lengths of from 2–20 and particularly alcohols having a carbon chain length of from about 8–16. These alcohols have been found to be especially useful in the manufacture of plasticizer esters, polyether type detergents, alkyl sulfate detergents and many other applications. In view of the need for alcohols, there has emanated from the petrochemical industry a variety of processes for their manufacture. In particular, the more recent developments include the Oxo process for producing highly branched primary alcohols, the so-called alkyl metal route for producing relatively straight chained primary alcohols, and of more recent vintage the telomerization process, briefly described above, also for the production of relatively straight chained primary alcohols.

In this process an alkyl ester of boric acid as the telogen is reacted with a low molecular weight olefin as the taxogen in the presence of a free radical source to provide an alkyl ester of boric acid having at least one alkyl substituent of greater chain length than the original alkyl compound. The required free radicals may be supplied in the form of unstable peroxygen or azo-bis-nitrile and similar compounds. The longer chain alkyl ester of boric acid may then be reacted with water or an alcohol boiling lower than the product alcohol and preferably with an alcohol corresponding to the alkoxy substituent of the initial alkoxy boron reagent. In this manner the longer chain alkoxy radical of the product is split off in the form of a free alcohol and the original alkoxy boron compound is regenerated for further use.

Trimethyl borate constitutes a reagent possessing unique advantages in the present invention since it results in the formation of primary alcohols, with relatively little formation of secondary alcohols, and is easily regenerated for reuse in the reaction by treatment of the reaction product with methanol. On the other hand, ethylene is the preferred olefin since it results in the formation of relatively straight chain alcohols; i.e., alcohols having not more than about one branch for every ten carbon atoms of the main chain. However, where it is not important that relatively straight chain, primary alcohols be produced, or that the boron telogen be regenerable and reusable, it is possible to use both olefins higher than ethylene; e.g., propylene or amylenes, and borate esters containing alkyl radicals higher than methyl or still other alkoxy substituted boron compounds corresponding to the formula

wherein R is an alkyl radical of 1 to 6 carbon atoms, and R' and R" are selected from the group consisting of alkoxy radicals of 1 to 6 carbon atoms, alkyl radicals of 1 to 6 carbon atoms, hydrogen, chlorine, fluorine and the like. Compounds exemplifying this class include trihexyl borate, propoxy diethyl boron, butoxy methyl hydrogen boron, dimethoxy boron chloride, etc.

The telomerization reaction of this invention is carried out at temperatures between about 120° and 675° F., preferably 255° to 500° F., it being understood that where a thermally unstable compound; e.g., a peroxy compound, is used as the free radical source, the reaction temperature is set high enough for the specific compound in use to undergo appreciable decomposition. Reaction pressures are generally above atmospheric; e.g., between 10 and 2,000 or more p.s.i.g. For instance, the reaction may be carried out under ethylene partial pressures between about 20 and 1,000 p.s.i., preferably 50 and 750 p.s.i. Naturally, total reaction pressures will be greater than the aforementioned ethylene pressures since the telogen; e.g., alkyl borate, also possesses an appreciable vapor pressure. Higher ethylene pressures increase the concentration of ethylene in the reaction mixture and accordingly tend to produce telomers of greater chain length, while lower ethylene pressures favor the formation of relatively small growth products. Thus, for instance, when it is desired to produce n-propanol by addition of one ethylene unit to trimethyl borate, pressures near the low end of the aforementioned range and relatively high temperatures are recommended. When alcohols of 20 or more carbon atoms are desired, pressure in the upper part of the range and relatively low temperatures are preferred.

The initiators especially useful in this reaction include hydroperoxides, such as cumene hydroperoxide, as well as tetralin hydroperoxide and tertiary butyl hydroperoxide; regular peroxides such as benzoyl peroxide, di-tertiary butyl peroxide, di-2-phenylpropyl-2-peroxide, hydrogen peroxide; as well as other per-oxygen compounds such as sodium persulfate, potassium peracetate, etc. $\alpha,\alpha'$-azo-bis-isobutyronitrile and similar $\alpha,\alpha'$-azo-bis alkyl nitriles, especially those having alkyl groups of 3 to 6 carbon atoms, such as those derived from 2-cyano butane, 2-cyano pentane, cyano cyclopentane, etc., are also useful as sources of free radicals. The initiator may most conveniently be supplied in the form of a solution, using either a solvent which is inert in the reaction; e.g., benzene, or preferably using a portion of the telogen as the solvent.

With regard to the concentration of initiator, it has now been found that unusual and unexpected results accrue from the use of extremely low initiator concentrations and that the results can be further accentuated by utilizing a lower holding time in the reaction zone during reaction conditions. In particular, it has been found that the amount of product in grams per gram of initiator employed can be substantially increased by resort to lower initiator concentrations than previously suggested. In addition, this increased initiator efficiency provides means for obtaining comparable yields of product with substantially lower holding times within the reaction zone thereby permitting the use of smaller reactors thus effecting substantial economies in building a commercial plant. Insofar as the commercial aspects of the present process are concerned, it is recognized that the cost of the initiator required to produce a given quantity of product is one of the most important factors affecting the overall economics of the process. The effect of initiator efficiency is substantially more pronounced than for example the effect of conversion. It has now been discovered that extremely high initiator efficiencies can be obtained by operating with initiator concentrations below about 0.11 wt. percent based on borate ester. Certain minimum concentrations of initiator should also be observed and it is contemplated that the range of 0.01 to less than about 0.11 wt. percent on borate ester is generally preferred and 0.02–0.06 wt. percent specifically preferred. When short holding or reaction times are employed in conjunction with low initiator concentrations, added benefits are obtained and the maximum initiator concentrations may be extended to about 0.22 wt. percent on borate ester. The initiator may be added in any convenient manner, for example, in one batch at the beginning of the reaction, continuously at a steady or fluctuating rate or in two or more increments. The use of slow initiator or incremental initiator addition further increases the initiator efficiency in terms of gram initiator per gram of product. The present process may of course be carried out as a batch, semi-continuous or continuous manner without departing from the scope of this invention. In the case of a continuous reaction where recycle streams are utilized the amount of initiator employed is preferably within the ranges indicated based on total fresh borate ester excluding recycle product mixture.

To obtain the maximum efficiency and yield in terms of grams of product per hour per given reactor size the holding time within the reaction zone under reaction conditions is preferably between 15 and 120 minutes and more preferably between about 60–90 minutes.

The typical telomerization reaction involved may be represented by the following reaction:

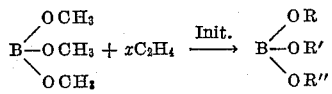

wherein R, R' and R'' are alkyl groups of the formula $-(C_2H_4)_nCH_3$ wherein $n$ is an integer in the range from 0 to 20, preferably 0 to 10, with the proviso, however, that at least one of the said three alkyl groups contains at least three carbon atoms. In this manner trialkyl borates having as many as 15 to 40 carbon atoms per alkyl group can be prepared.

To illustrate the present invention resort will now be had to the specific examples which follow.

EXAMPLE 2080 cc. of redistilled trimethyl borate were added to a one-gallon stirred autoclave. The bomb was then heated to about 437° F. and then pressured with ethylene to a total pressure of 960 p.s.i.g. and an ethylene partial pressure of 480 p.s.i.g. Initiator consisting of 2.37 grams of ditertiary butyl peroxide in a small amount of trimethyl borate was added slowly over a period of 90 minutes or at a rate of 0.76 gm. per liter of trimethyl borate per hour. The total pressure was maintained between 925 to 985 p.s.i.g. for the entire run and the temperature was maintained between 430° F. to 445° F. After 90 minutes the autoclave was cooled, vented and the liquid product discharged into a distillation flask. The aforegoing portion of this example relates to the telomerization reaction per se. The product work up is as follows. The borate ester reaction product is mixed with equal amounts of methanol and refluxed for 30 minutes. This effects a substitution of the methanol radical for the longer chain alcohol radicals forming a part of the borate ester reaction product.

There were obtained approximately 112 grams of product which were analyzed as follows:

Mol wt. (average) _____ 183
Carbon No. (average) _____ 11.8
Olefins, wt. percent _____ 16.0
Alcohols, wt. percent _____ 59.0
Aldehydes, wt. percent _____ 0.6
Esters, wt. percent _____ 0.3
Acids, wt. percent _____ 0.1
Carbon, wt. percent _____ 78.99
Hydrogen, wt. percent _____ 14.04
Oxygen, wt. percent _____ 6.61

To demonstrate the superior results obtainable by the present process, resort may now be had to the following table which sets forth results obtained in a number of comparative runs.

Table I

TRIMETHYL BORATE-$C_2H_4$-DTBP (2 liters)

[437° F., 475 p.s.i.g. $C_2H_4$ part. press.]

| Run No. | T-80 | T-81 | T-90 | T-102 | T-82 | T-89 | T-95 |
|---|---|---|---|---|---|---|---|
| Time, Min. | 150 | 150 | 150 | 150 | 90 | 90 | 90 |
| DTBP Initiator: | | | | | | | |
| Total Gms. | 8.72 | 4.85 | 2.43 | 1.14 | 2.37 | 1.42 | 0.74 |
| Gm./Liter/Hour | 1.63 | 0.90 | 0.45 | 0.22 | 0.76 | 0.45 | 0.23 |
| Gm. Liter TMB | 4.07 | 2.24 | 1.12 | 0.53 | 1.14 | 0.68 | 0.35 |
| Yield: | | | | | | | |
| Gm./Gm. (Init.) | 23 | 34 | 46 | 84.5 | 47 | 63 | 103 |
| Gm./Hour | 80 | 66 | 45 | 39 | 75 | 60 | 51 |
| Total Gm./Run | 200 | 165 | 112 | 97 | 112 | 89 | 77 |
| Total Initiator, wt. percent on TMB | 0.48 | 0.276 | 0.13 | .063 | 0.12 | 0.08 | 0.04 |

The variables in the above comparative runs were time and amount of initiator. Two conclusions are immediately apparent upon analysis of the data in the above table. First as the initiator concentration is lowered there is an accompanying sharp increase in the initiator efficiency as determined by the grams of product yield per gram of initiator. This result is also evidenced by the grams of product per hour of reaction time comparing the four 150 minute runs and then the three 90 minute runs. Second, it is evident that the shorter duration runs provide substantially increased yield in terms of yield per hour without decreasing the over-all or total yield of product. Comparison of runs T–82 and T–90 dramatizes this latter result and is surprising in view of the fact that the initiator was added at a faster rate in run T–82 as compared to run T–90, whereas the overall data strongly suggest that the slower initiator addition rates will promote higher initiator efficiencies.

To further illustrate the effect of initiator concentration, reference is now had to the FIGURE in the drawing which plots grams of initiator per liter of trimethyl borate against the grams of product per gram of initiator. Using 2 or more grams of initiator which in this case is 0.22 wt. percent, efficiencies of well below 40 are experienced. Lowering the initiator concentration to 1 gram or 0.11 wt. percent, the efficiency is raised to 60 and extremely high efficiencies are obtained at concentrations between about 0.02 and 0.06 wt. percent.

The alcohol product comprises a mixture which is subject to fractionation and may be purified by any of the known techniques which might include hydrofining, stabilization by the addition of chemicals having a high reducing activity as against carbonyls, etc. The alcohols obtainable by resort to this process may contain odd or even chain lengths depending on the particular borate esters employed. For example, the use of trimethyl borate with ethylene will permit the production of alcohols having an odd number of carbon atoms; e.g., heptanol, tridecanol, etc., whereas the use of a triethyl ester of boric acid will permit the production of alcohols having an even number of carbon atoms.

It will be understood that various modifications or variations not specifically disclosed may be used in the process of the invention without departing from the scope and spirit hereof.

What is claimed is:

1. A process for making alkoxy boron compounds which comprises reacting ethylene with a boron compound corresponding to the formula

wherein R is an alkyl radical and R' and R" are radicals selected from the group consisting of alkoxy, alkyl, hydrogen and halogen, at elevated temperatures in the presence of about 0.011 to 0.11 weight percent of a peroxidic initiator based on boron compound.

2. A process in accordance with claim 1 wherein the initiator is present in a total amount of from 0.02–0.06 wt. percent based on boron compound.

3. A process in accordance with claim 1 wherein the peroxidic initiator is ditertiary butyl peroxide.

4. A process in accordance with claim 1 wherein the peroxidic initiator is cumene peroxide.

5. A process for making alkoxy boron compounds which comprises mixing ethylene and a boron compound corresponding to the formula

wherein R is an alkyl radical of 1 to 6 carbon atoms and R' and R" are selected from the group consisting of alkoxy radicals of 1 to 6 carbon atoms, alkyl radicals of 1 to 6 carbon atoms, hydrogen and halogen, and maintaining the resulting mixture at a temperature between 120° and 675° F. at superatmospheric pressure in contact with a total of 0.011 to less than about 0.11 weight percent of a peroxidic initiator based on boron compound.

6. A process in accordance with claim 5 wherein the peroxidic initiator is ditertiary butyl peroxide.

7. A process in accordance with claim 5 wherein the peroxidic initiator is cumene peroxide.

8. A process in accordance with claim 5 wherein the peroxidic initiator is benzoyl peroxide.

9. A process in accordance with claim 5 wherein the peroxidic initiator is diphenylpropyl-2-peroxide.

10. A process in accordance with claim 5 wherein the peroxidic initiator is hydrogen peroxide.

11. A process in accordance with claim 5 wherein the peroxidic initiator is α,α'-azo-bis-isobutyronitrile.

12. A process for making alkoxy boron compounds which comprises mixing ethylene and a boron compound corresponding to the formula

wherein R is an alkyl radical of 1 to 6 carbon atoms and R' and R" are selected from the group consisting of alkoxy radicals of 1 to 6 carbon atoms, alkyl radicals of 1 to 6 carbon atoms, hydrogen and halogen, and maintaining the resulting mixture at a temperature between 120° and 675° F. at superatmospheric pressure in contact with a total of 0.011 to 0.22 weight percent of a peroxidic initiator based on boron compound for a time between 15 and 120 minutes.

13. A process in accordance with claim 12 wherein the peroxidic initiator is ditertiary butyl peroxide.

14. A process in accordance with claim 12 wherein the peroxidic initiator is cumene peroxide.

15. A process in accordance with claim 12 wherein the peroxidic initiator is benzoyl peroxide.

16. A process in accordance with claim 12 wherein the peroxidic initiator is diphenylpropyl-2-peroxide.

17. A process in accordance with claim 12 wherein the peroxidic initiator is hydrogen peroxide.

18. A process in accordance with claim 12 wherein the peroxidic initiator is α,α'-azo-bis-isobutyronitrile.

References Cited in the file of this patent
UNITED STATES PATENTS 2,423,497     Harmon _____ July 8, 1947